United States Patent [19]

Houlgrave et al.

[11] 4,103,863
[45] Aug. 1, 1978

[54] ACTUATOR FOR EXPANDING GATE VALVES

[75] Inventors: Robert C. Houlgrave; Larry J. Talafuse, both of Houston, Tex.

[73] Assignee: ACF Industries, Incorporated, New York, N.Y.

[21] Appl. No.: 729,324

[22] Filed: Oct. 4, 1976

Related U.S. Application Data

[63] Continuation-in-part of Ser. No. 567,573, Apr. 14, 1975, abandoned.

[51] Int. Cl.² ............................................. F16K 31/122
[52] U.S. Cl. .......................................... 251/48; 91/25; 251/63.5; 251/196
[58] Field of Search ..................... 251/14, 48, 52, 55, 251/62, 63, 63.5, 203, 204, 326, 195, 282, 51, 196; 91/48, 130 R, 405, 408, 409, 449, 454, 4 R, 25, 26, 396, 406

[56] References Cited

U.S. PATENT DOCUMENTS

| | | | |
|---|---|---|---|
| 2,363,142 | 11/1944 | Reed | 91/25 |
| 2,398,997 | 4/1946 | Berry et al. | 91/48 |
| 2,583,512 | 1/1952 | Lauvent | 251/195 |
| 2,676,780 | 4/1954 | Wheatley | 251/204 |
| 2,918,085 | 12/1959 | Govan et al. | 251/62 |
| 2,949,894 | 8/1960 | Hewitt | 91/4 R |
| 3,003,742 | 10/1961 | Kearns | 251/204 |
| 3,067,726 | 12/1962 | Williams | 91/396 |
| 3,086,745 | 4/1963 | Natho | 251/62 |
| 3,226,078 | 12/1965 | Anderson | 251/62 |
| 3,450,003 | 6/1969 | Nightingale | 91/396 |

FOREIGN PATENT DOCUMENTS

| | | | |
|---|---|---|---|
| 740,687 | 8/1966 | Canada | 91/405 |

*Primary Examiner*—Martin P. Schwadron
*Assistant Examiner*—G. L. Walton
*Attorney, Agent, or Firm*—Eugene N. Riddle

[57] ABSTRACT

A valve actuator for an expanding gate valve having a gate and a segment thereon. The actuator includes a piston connected to a gate stem and mounted within a cylinder with a pressurized gas on the upper side of the piston and liquid on the lower side of the piston. The gate valve moves from an open position to a closed position across the flow passage at a rapid rate and decelerates adjacent the end of its downward movement upon a metering of the liquid in the cylinder. The expanding gate valve expands laterally into fluid-tight sealing relation at the end of the downward stroke after moving across the flow passage. The bonnet is mounted internally of the valve body and a pressure seal is positioned between the bonnet and the valve body to permit operation of the valve actuator and gate valve even after failure of the pressure seal.

10 Claims, 6 Drawing Figures

ACTUATOR FOR EXPANDING GATE VALVES

REFERENCE TO RELATED APPLICATION

This application is a continuation-in-part of application Ser. No. 567,573 filed Apr. 14, 1975 now abandoned.

BACKGROUND OF THE INVENTION

In the generation of electricity steam generators are typically used to power turbines that are connected to electrical generators. In some installations it is necessary or desirable to provide some means of isolating a steam generator from the turbines and other portions of the steam system. In nuclear-powered generating units it is necessary to be able to substantially instantaneously isolate the steam generator from the remainder of the system for safety reasons. Isolation valves normally provided for steam generators are of the gate valve type, however, they are not provided with actuators which will close the valves quickly. In nuclear-powered electric generating stations much emphasis is placed on safety and therefore a dual control system is required for operating many elements. Additionally the operation elements in these generating stations must be constructed so they will close to shut down the system in the event of a failure or an emergency. In the art many actuators and control systems are known for opening and closing of valves; however they are not particularly adapted for opening and closing large high pressure gate valves such as those used with steam generating power plants. The prior art valve actuators and control systems are constructed to close the large valves relatively slowly. Additionally these control systems do not have the redundancy which is necessary for operating in a nuclear power generation system environment. Valve control systems are known in the art which have a piston and cylinder apparatus connected to the valve closure member wherein air or some other gaseous fluid is on one side of the piston and hydraulic fluid is on the opposite side of the piston. These control systems are used for controlling the position of the valve closure member so it can be used in a partially open position to regulate fluid flow through a line. This is illustrated in U.S. Pat. No. 2,918,085.

Gate valves employed heretofore in such power plants have not been of the expanding gate valve type in which a gate and segment carried thereby are cammed outwardly at the end of a stroke into tight sealing relation with the seats in a metal-to-metal sealing contact with the gate and segment. Gate valve seats for high temperature service above around 450° F. require a metal-to-metal sealing surface as Teflon or rubber seals will be destroyed by high temperatures such as encountered in steam service which may be as high as around 850° F. Wedge type gates and gate having springs to effect a metal-to-metal seal by urging a gate member outwardly have been employed heretofore in such high temperature service but such gates have not utilized a gate and segment in which the segment is first stopped adjacent the end of a stroke and the gate is then cammed outwardly into fluid-tight metal-to-metal contact with the seats for the remainder of the gate travel.

BRIEF DESCRIPTION OF INVENTION

In order to accomplish the required control necessary for use in a nuclear-powered generating station the present invention is comprised of a piston and cylinder type actuator wherein compressed gaseous fluid is contained in the cylinder to effect closure of a main steam isolation valve and hydraulic fluid pressure is maintained on the opposite side of the piston to retain the piston and stem in a retracted position to keep the valve open. The control system for the valve actuator includes two hydraulic fluid dump valves and controls therefor connected in a parallel relation with either dump valve being operable to release fluid from the cylinder for closing the main steam isolation valve. The piston and cylinder apparatus includes a device to decelerate the piston and the valve closure member before the valve closes to prevent jamming of the valve structure. In another embodiment a spring is provided to urge the piston toward the extended position to effect closure of the valve.

The valve, valve actuator and control therefor is suitable for closing high pressure steam lines where a high degree of reliability is essential. The actuator is preferably used with an expanding type gate valve because this gate valve has substantially no leakage especially when installed in a high pressure steam line. The piston and cylinder apparatus contains pressurized or compressed gas in a cavity in the cylinder on one side of the piston. The piston and its attached stem are normally retained in a retracted position with the valve being open. Hydraulic pressure on the opposite side of the piston retains or holds the piston and its attached stem in a retracted position against forces of the compressed gas. Upon release of the hydraulic fluid by the control system the compressed gas moves the piston and its stem to an extended position closing the isolation valve.

The valve structure comprising the present invention includes a gas-hydraulic actuator for a relatively large expanding gate valve which will move the gate valve in a downward stroke in a minimum of time. The expanding gate valve has a gate carrying a segment thereon and the actuator decelerates the gate valve adjacent the end of its downward stroke before the segment engages a stop so that any slamming action of the segment on the stop is minimized. When the segment engages the stop the gate continues to move downwardly to cam the segment and gate laterally into fluid-tight metal-to-metal sealing contact with the adjacent gate valve seats. The pressurized gas of the gas-hydraulic actuator acts as a spring but is particularly useful for a wide range of operating pressures which are encountered in the various services.

Another feature includes the mounting for the gas-hydraulic actuator in which the yoke supporting the actuator is supported directly on the valve body and not on the bonnet. The bonnet which receives the gate valve stem is an internal bonnet connected to the interior of the valve body and does not transmit forces directly to the yoke. This provides a safety feature in that the bonnet may fail from abnormally high pressures in the valve body independently of the yoke.

It is an object of this invention to provide a gas-hydraulic actuator for a large expanding gate valve to be used in high pressure service which will substantially instantaneously close the valve with an extremely high degree of reliability and wherein the control system for the actuator has a redundant operating system for safety.

Another object of this invention is to provide a hydraulically cushioned actuator for rapid closing of the expanding gate valve where the actuator has a hydraulic device to decelerate the valve closure assembly before it reaches a closed position to prevent slamming the valve closed.

A further object of this invention is to provide a mounting structure for the gas-hydraulic actuator supported directly on the valve body with a bonnet for the associated valve structure mounted internally of the valve body.

Various other objects, advantages, and features of the invention will become apparent to those skilled in the art from the following discussion and the accompanying drawings, in which:

The following is a discussion and description of the valve, valve actuator and control therefor, such being made with reference to the drawings, whereupon the same reference numerals are used to indicate the same or similar parts and/or structure. It is to be understood this discussion and description is not to unduly limit the scope of the invention.

DETAILED DESCRIPTION

Figure 1:
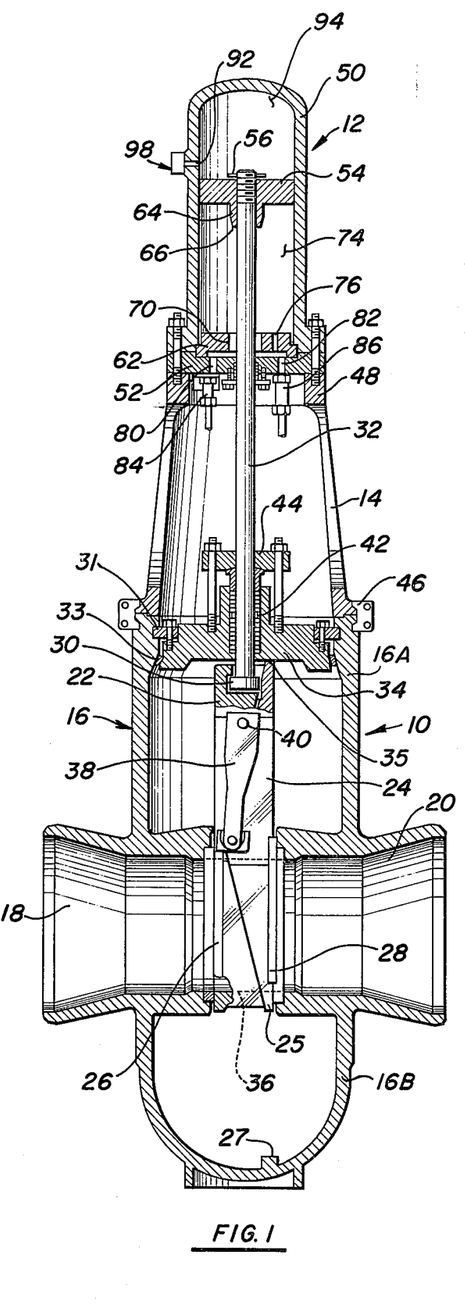
FIG. 1 is a sectional view of the actuator comprising the present invention employed with an expanding gate valve shown in open position.
Figures 5, 6:
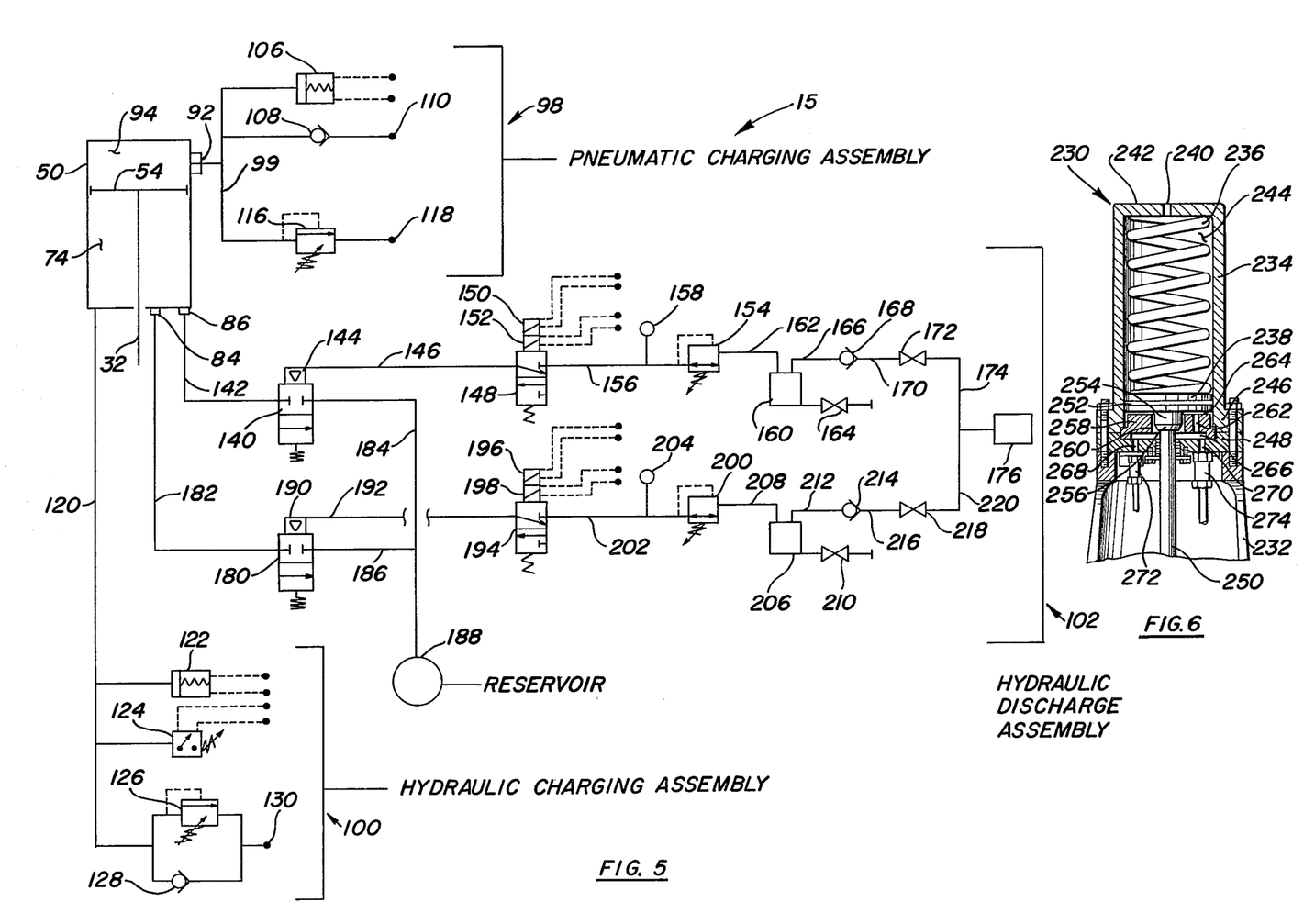
FIG. 5 is a schematic diagram of the control circuit for the actuator of this invention.
FIG. 6 is a cutaway elevation view of an embodiment of the actuator having a spring and shown on the upper portion of a valve yoke structure.

Referring to the drawings in general and specifically to FIG. 1, an expandable gate valve indicated generally at 10 is shown with a gas-hydraulic embodiment of the actuator indicated generally at 12 mounted on a valve yoke 14. A gas-hydraulic actuator control system is shown schematically in FIG. 5 and indicated generally at 15. FIG. 6 shows an embodiment of the actuator, indicated generally at 230, having a spring.

The expanding gate valve 10 is an item well known in the art. It is comprised of a valve body 16 having an inlet 18 and an outlet 20 with an expandable valve closure assembly having a slidably mounted gate 22 and segment 24 supported on seat skirts 26 and 28 within the valve body. Seat skirts 26 and 28 have metal seats therein about the flow passage for engaging gate 22 and segment 24 repsectively. The seats in skirts 26 and 28 do not have any Teflon or rubber seals therein and are adapted to seal in metal-to-metal contact with gate 22 and segment 24 for high temperature service above 450° F. Gate 22 is retained on an enlarged end portion 30 of the valve stem 32. Segment 24 is movably mounted with gate 22 and retained by a centralizer. Segment 24 is normally carried with gate 22 and it moves in up and down sliding motion in the guides 26 and 28. Valve body 16 includes a generally cylindrical upper body portion 16A forming an upper valve receiving chamber and a lower body portion 16B forming a lower valve receiving chamber. Upper body portion 16A has an open end and valve yoke 14 is supported on the open outer end of body portion 16A. A yoke retaining clamp 46 secures yoke 14 directly to upper body portion 16A. Opening 36 in gate 22 and segment 24 forms the flow passage therethrough.

Figure 4:
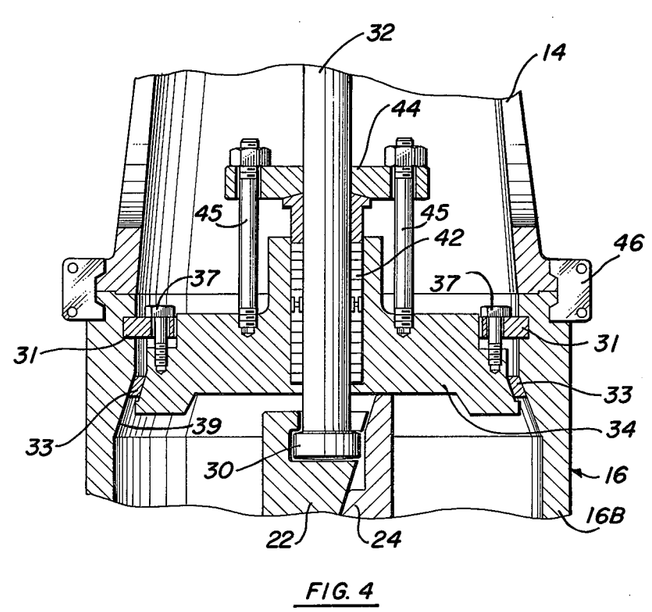
FIG. 4 is an enlarged sectional view of the juncture of the gate valve body and the yoke with the bonnet mounted internally of the gate valve body and the yoke supported directly on the valve body, the gate valve being illustrated in an open position.

A bonnet structure receiving valve stem 32 is mounted internally in upper portion 16A of valve body 16 by a bonnet retainer shear ring 31 received in a groove in the valve body and bolted to bonnet 34 by bolts 37. The interior of body portion 16B is tapered inwardly adjacent its upper end to form tapered surface 39 and a tapered or frusto-conical pressure seal ring 33 is positioned between the outer periphery of bonnet 34 and the tapered surface 39. Tightening of bolts 37 pulls bonnet 34 upwardly to stress pressure seal ring 33. Bonnet 34 has a central opening receiving stem 32 and packing 42 is positioned around stem 32 within the opening. A follower plate 44 is bolted to bonnet 24 by bolts 45 and exerts an expanding pressure on packing 42 upon tightening of bolts 45. In the event pressure seal 33 fails from an abnormally high pressure within upper body portion 16A, bonnet 34 moves upwardly to engage shear ring 31 without transmitting such forces to yoke 14 and actuator 15. Thus, actuator 15 remains operable to close expanding gate valve 10 even after failure of pressure seal 33 or failure of shear ring 31.

With valve 10 in the open position as shown in FIG. 1 the extreme upper end portion 35 of segment 24 first contacts the lower surface of bonnet 34 and further movement of gate 22 expands gate 22 and segment 24 into metal-to-metal sealing contact with the seats of skirts 26 and 28 about opening 36 through gate 22 and segment 24. In the closed position the lowermost end 25 of segment 24 first contacts a closed position stop 27 in the lower portion of valve body 16 and further movement of gate 22 causes segment 24 to be displaced on gate 22 thus expanding the thickness of the valve closure assembly between the seats. Opening or aperture 36 is shown in dashed lines in FIGS. 1 and 2. A lever lock arm 38 is mounted on the end of a cam 40 extending from the side of gate 22. Lever lock arm 38 is connected by a cam (not shown) to segment 24. As gate 22 and segment 24 are moved from open position to closed position the lower end of lever lock arm 38 slides between guides 26 and 28 to prevent segment 24 from wedging gate 22 and the seats at any position other than the full open position or the full closed position.

Figure 2:
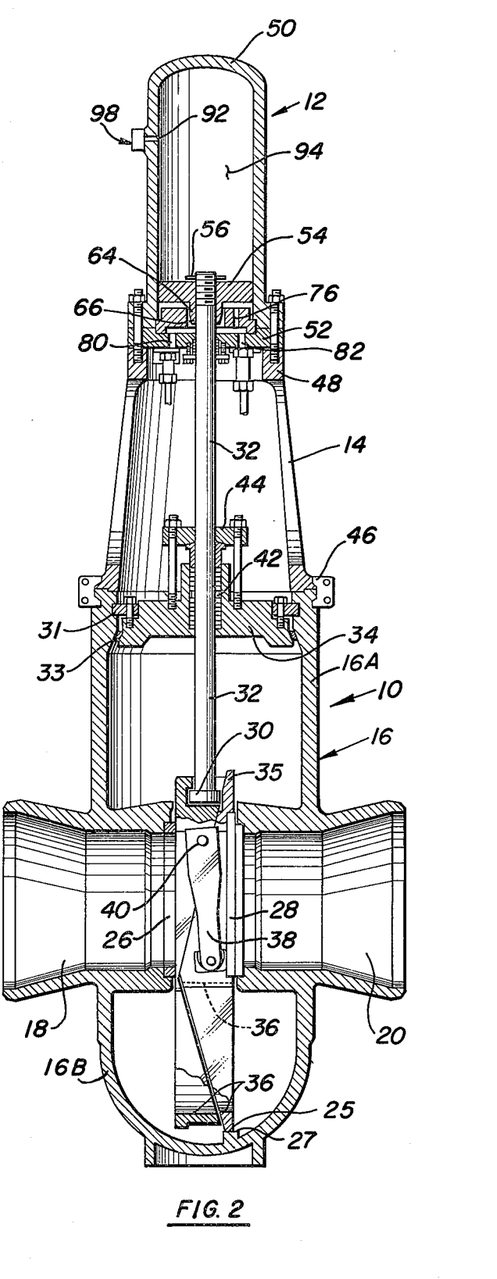
FIG. 2 is a sectional view of the actuator shown in FIG. 1 with the expanding gate valve shown in a fully closed position.
Figure 3:
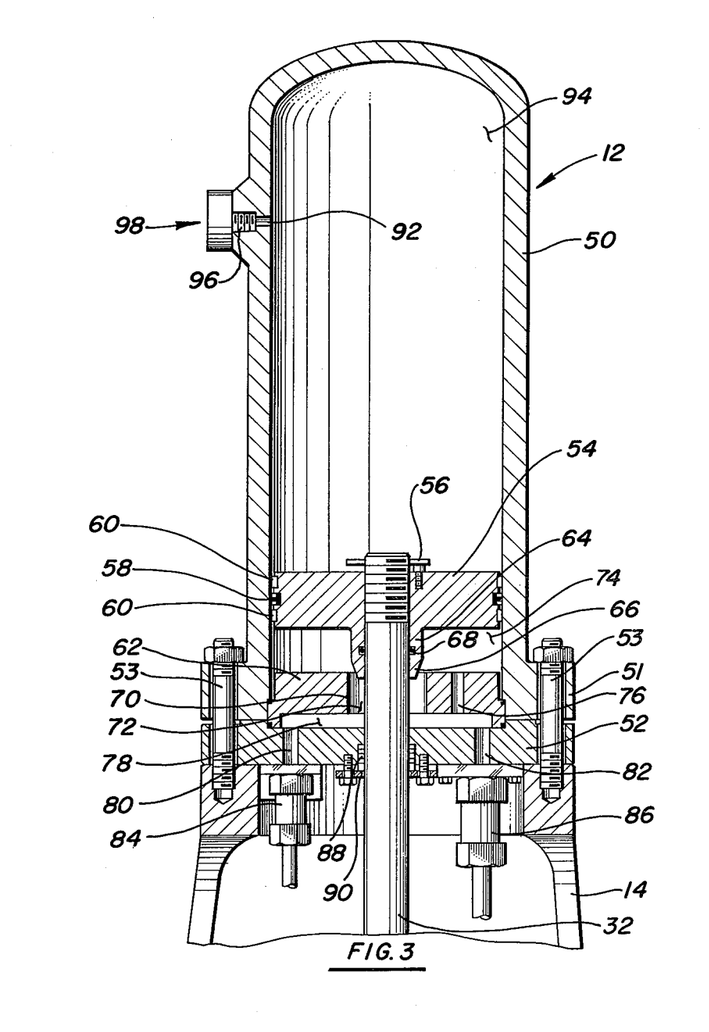
FIG. 3 is an enlarged sectional view of the piston and cylinder portion of the actuator and the upper portion of the valve yoke structure with the piston shown near the end of its downward stroke in the cylinder.

The upper portion of yoke 14 has a cylinder mounting ring portion 48 on which one end of the piston and cylinder apparatus of gas-hydraulic actuator 12 is mounted. FIG. 3 shows in detail the piston and cylinder apparatus mounted on yoke 14. The piston and cylinder apparatus includes a cylinder 50 having one end thereof closed and the opposite end thereof mounted on a cylinder base plate 52 that is mounted on the upper end of yoke 14. Cylinder 50 has an outward extending flange 51 on its lower or mounted end. Bolts 53 extend through cylinder flange 51 and cylinder base plate 52 into the upper end of yoke 14 to rigidly secure cylinder 50 and base plate 52 in place. Cylinder 50 encloses a piston 54 mounted on the end portion of stem 32. A locking ring 56 secures piston 54 to stem 32. Piston 54 is provided with a T-seal 58 disposed between sealing rings 60 on its perimeter. A seal plate member 62 is mounted in the end of cylinder 50 adjacent to cylinder base plate 52. Piston 54 has a protrusion in the form of a generally cylindrical enlarged portion extending from the stem side thereof around stem 32. The enlarged portion has a uniform diameter cylindrical portion 64 adjacent to the piston and a tapered portion 66 on the portion which is most distant from the piston. The tapered portion 66 is generally frusto-conically shaped tapering toward stem 32 and has its exterior surface smoothly contoured into cylindrical and cross-sectionally circular portion 64 at the juncture of the two portions. An O-ring gasket 68 is provided on the interior of the enlarged portion around stem 32. Seal plate 62 is provided with a centrally disposed aperture 70 to receive the enlarged portion. The interior surface 72 of aperture 70 is cylindrical and cross-sectionally circular and it is sized slightly larger than the exterior diameter of cylindrical portion 64. Spacing between the outside of the enlarged portion and surface 72 in aperture 70 provides a metering passageway to regulate the flow of fluid from cavity 74 between piston 54 and the seal plate 62 when the enlarged portion enters aperture 70. FIG. 2 shows piston 54 in a position adjacent to seal plate 62 with the enlarged portion in aperture 70. Seal plate 62 is provided with a second aperture 76 therethrough. Aperture 76 is a fluid metering aperture located in a spaced relation to aperture 70. It meters liquid flow from cavity 74 into another cavity 78 between seal plate 62 and cylinder base plate 52.

Cylinder base plate 52 is provided with a pair of apertures 80 and 82 therethrough for fluid communication with cavity 78. Aperture 80 is connected with a fluid conduit connecting fitting 84 below cylinder base plate 52. Aperture 82 is connected with a fluid conduit connecting fitting 86 also mounted below cylinder base plate 52. Fittings 84 and 86 are provided for fluid communication with the valve apparatus for releasing or dumping fluid from cavity 74. An additional conduit connecting fitting (not visible) is provided for filling cavity 74 with hydraulic fluid. On the exposed side of cylinder base plate 52 stem packing 88 is provided around stem 32 and held in place by follower plate 90. In the closed end portion of cylinder 50 a port 92 is provided through the cylinder wall for fluid communication with the cavity 94 in that end portion of the cylinder. Port 92 has a threaded outer portion 96 for attaching fluid conduit fittings to connect a pneumatic charging assembly, indicated generally at 98.

Construction of the protrusion or enlarged portion on piston 54, seal plate 62 and cylinder base plate 52 are important features of actuator 12 because these elements function cooperatively to decelerate piston 54 and the valve closure assembly when the valve is moved from the open position to the closed position. Deceleration of the valve closure assembly is accomplished by hydraulic cushioning in the lower end portion of cylinder 50. In open position the valve closure assembly and actuator 12 are positioned as shown in FIG. 1. In this position hydraulic fluid is contained in cavity 74 and compressed gas is contained in cavity 94. Once the hydraulic fluid is released or dumped it flows from cylinder 50 throuth either fitting 84 or 86 as piston 54 is forced toward an extended position by the resilient force of compressed gas in cavity 94. Before the enlarged portion enters aperture 70 hydraulic fluid flows through aperture 70 around stem 32 and through aperture 76. Once the tapered portion 66 enters aperture 70 fluid flow is restricted and metered through the space between these two elements and through aperture 76. As tapered portion 66 proceeds into aperture 70 the flow is further restricted thereby decreasing the flow rate from cavity 74 thus decelerating piston 54 and the valve closure assembly. Preferably the spacing between surface 72 and the exterior of cylindrical portion 64 is relatively small as compared to the diameter of the enlarged portion. Thus once cylindrical portion 64 enters aperture 70 then hydraulic fluid flow will be substantially restricted and the flow rate significantly diminished relative to that before the enlarged portion enters aperture 70. When cylindrical portion 64 is in aperture 70 then hydraulic fluid flowing from cavity 74 is metered through fluid metering aperture 76 and through the space between surface 72 and the exterior surface of cylindrical portion 64. Obviously spacing between surface 72 and cylindrical portion 64 and the cross-sectional area of aperture 76 can be selected to provide metering as necessary for suitable deceleration of the valve closure assembly as required by the user.

Timing of the valve closure assembly expansion and its deceleration are important factors in proper operation of valve actuator 12. The valve closure assembly must be decelerated prior to expansion to prevent slamming it into closed position. Proper deceleration avoids damage to the valve structure and jamming. Preferably deceleration is started substantially before the valve closure assembly nears the closed position so it will be traveling very slowly when segment 24 impacts on the closed position stop 27.

FIG. 5 shows in schematic form a hydraulic, pneumatic and electrical circuit for control and operation of valve actuator 12. Pneumatic charging assembly 98 is shown connected by a common conduit 99 to cylinder 50 and specifically cavity 94. A hydraulic charging assembly, indicated generally at 100, is connected by feeder conduit 120 to cylinder 50 and specifically cavity 74. A hydraulic discharge assembly indicated generally at 102 is connected by conduits to cavity 74 and joined with cylinder 50 at fittings 84 and 86.

Pneumatic charging assembly 98 includes a pressure sensor 106 which is electrically connectable to a remote location for monitoring pressure in cavity 94. A normally closed check valve 108 is connected in parallel with pressure sensor 106 to provide a valve for filling cavity 94 through a port 110. A relief valve 116 is connected by conduit 99 to cavity 94 and connected by another conduit to a relief port 118. Relief valve 116 is adjustable to a predetermined and certain pressure for venting excess pressure in cavity 94 to the atmosphere. Pressure sensor 106, check valve 108 and relief valve 116 are all connected to single conduit 99 which is in turn connected to port 92 in cylinder 50. Because the pneumatic charging assembly 98 has few components it can be made relatively small and it is preferably mounted on the side of cylinder 50 as shown in FIGS. 1-3. Obviously the operating pressure in cavity 94 decreases as the valve opens. The static charged pressure will vary depending upon the size of the gate valve, the size of the piston and cylinder assembly, and other factors.

Hydraulic charging assembly 100 includes feeder conduit 120 connected in fluid communication with cavity 74, a pressure sensor 122 connected by a suitable conduit with feeder conduit 120 electrically connected to a remote location, a low level warning device 124 connected by a suitable conduit to feeder conduit 120 and electrically connected to a remote location, a relief valve 126 connected in parallel with a check valve 128 and both connected in feeder conduit 120, and a hydraulic inlet port 130 at the inlet of conduit 120. Pressure sensor 122 is provided for remote monitoring of the pressure in cavity 174. Low pressure warning device 124 is provided to warn an operator that pressure in cavity 174 is below a predetermined and certain value and/or to start a hydraulic pump in a pumping module, not shown. Relief valve 126 is opened to relieve excess pressure from cavity 74. The pumping module is connected with hydraulic inlet port 130 for filling and charging the hydraulic portion of the circuit through check valve 128. Relief valve 126 is necessary to prevent excessive pressure build-up in cavity 74. Because of the incompressible hydraulic fluid and the high temperature environment of steam isolation valves this relief capability is necessary to compensate for excessive temperature increases thus preventing possible damage to valve 10 or actuator 12. Pressure in cavity 74 is maintained within a predetermined and certain range to retain the actuator in its retracted position as shown in FIG. 1. When pressure in cavity 74 is above a predetermined and certain value then relief valve 126 discharges fluid to lower the pressure. When pressure in cavity 74 drops below a predetermined and certain value then low pressure warning device 124 signals an operator at a remote location and automatically starts the pump in the hydraulic pumping module to replenish fluid and raise the pressure in cavity 74 to within the desired range. Low pressure in cavity 74 can be caused by temperature changes which affect the volume of the hydraulic fluid or leaks in the piston and cylinder apparatus or hydraulic circuit.

Hydraulic discharge assembly 102 is shown in the center portion of FIG. 5. It includes a pair of pilot operated dump valves communicably connected in parallel to a reservoir for dumping fluid from cavity 74. One pilot operated dump valve 140 is connected by conduit 142 to fitting 86 on cylinder 50. A pneumatic pilot operator 144 is mounted on dump valve 140 and connected by conduit 146 to the pilot valve 148. Pilot valve 148 has a pair of electrical solenoids 150 and 152 to move the closure member thereof. Solenoids 150 and 152 are operable by direct current and constructed so that either one alone can move the pilot valve closure member and both of them are separately and individually connected to a remote control terminal. A pressure regulator 154 is connected by conduit 156 to the inlet of pilot valve 148. A pressure gauge 158 is connected to conduit 156 for monitoring pressure to pilot valve 148. A pressurized gas storage vessel 160 is connected by conduit 162 to the inlet of pressure regulator 154. A manual shut off valve 164 is connected to storage vessel 160 to serve as a manual bleed. A check valve 168 is connected by conduit 166 to storage vessel 160. Conduit 170 connects the inlet of check valve 168 to a manual shut off valve 172. Conduit 174 connects the inlet of manual shut off valve 172 to a gaseous fluid source 176. The gaseous fluid source 176 can vary depending upon the particular installation. If a suitable gas is available from a common plant type supply it can be connected to conduit 174. In the instance where no such supply is available then a pressurized storage vessel can be used as a gaseous fluid source. Either compressed air or nitrogen can be used as the operating fluid for the pilot circuit. Nitrogen is preferred because of its inert properties.

The other pilot operated dump valve 180 and its associated elements are shown in the center portion of FIG. 5 below the portion of the circuit having dump valve 140. Hydraulic dump valve 180 is connected by conduit 182 to fitting 84 on cylinder 50. Discharge conduits 184 and 186 connect hydraulic dump valves 140 and 180 respectively to a reservoir 188. A pneumatic pilot operator 190 is mounted on hydraulic dump valve 180 and connected by suitable conduit to pilot valve 194. Pilot valve 194 has a pair of direct current operable electrical solenoids 196 and 198 mounted thereon to move its valve closure member. Solenoids 196 and 198 are constructed so that either one alone can move the pilot valve closure member. Both solenoids 196 and 198 are individually electrically connected to a remote control terminal. A pressure regulator 200 is connected by conduit 202 to the inlet of pilot valve 194. A pressure gauge 204 is connected to conduit 202 for monitoring gas pressure to pilot valve 194. A pressurized gas storage vessel 206 is connected by conduit 208 to the inlet of pressure regulator 200. A manual shut off valve 210 is connected to storage vessel 206 to serve as a manual bleed. Conduit 212 from storage vessel 206 connects to a check valve 214. Check valve 214 permits fluid flow into storage vessel 206. A manual shut off valve 218 is connected by conduit 216 to the inlet of check valve 214. Conduit 220 connects manual shut off valve 218 to pressurized gas source 176. Manual shut off valves 172 and 218 are provided to allow portions of the pneumatic circuit to be isolated for maintenance and testing.

In use and operation of the valve, valve operation, and valve control system of this invention, gate valve 10 is normally maintained in open position as shown in FIG. 1. In this condition all the control system valves as shown in FIG. 5 are positioned as illustrated. In this normal operation condition cavity 94 contains pressurized gas, preferably nitrogen, in a pressure sufficient to force piston 54 downwardly to open gate valve 10 as hydraulic fluid in cavity 74 is dumped to the reservoir. As long as hydraulic dump valves 140 and 180 are closed then hydraulic fluid is retained in cavity 74 and piston 54 is retained in the raised position as shown in FIGS. 1 and 5. When either of the hydraulic dump valves 140 or 180 is opened then hydraulic fluid will flow to reservoir 188 and the compressed gas in cavity 94 will force piston 54 downwardly thereby closing gate valve 10. To open hydraulic dump valve 140 either of the solenoids 150 or 152 can be activated thus opening pilot valve 148 which in turn activates pilot operator 144 and causes it to open hydraulic dump valve 140. In opening hydraulic dump valve 180 either of the solenoids 196 and 198 can be activated thus opening pilot valve operator 194 and activating the pilot operator 190 and causing it to open hydraulic dump valve 180. To open gate valve 10 the hydraulic dump valve which was previously opened must be closed by deactivating the appropriate solenoid on the appropriate pilot valve then hydraulic fluid can be pumped through inlet port 130 into cavity 74 to raise piston 54.

In operation, actuator 12 has been successfully operated for closing an expanding gate valve having a diameter of approximately 16 inches, for example. With the expanding gate valve in open position as shown in FIG. 1, cavity 94 is pressurized to a pressure of around 2,500 PSI and hydraulic fluid in cavity 74 has a pressure of around 2,750 PSI with a pressure differential of around 250 PSI between cavities 94 and 74. When hydraulic fluid is dumped to the reservoir for moving gate valve 10, the hydraulic fluid drops practically instantaneously to around 400 PSI and gate valve 10 moves rapidly toward a closed position. Gate valve 10 begins its deceleration around one and one-half inches before the end 25 of segment 24 engages stop 27 thereby to slow the movement of gate valve 10 to minimize the slamming action of segment 24 against stop 27. Gate valve 10 moves across the flow passage between inlet 18 and outlet 20 before end 25 engages stop 27 but after the deceleration has begun. However, since gate valve 10 is an expanding gate valve, fluid-tight sealing between gate valve 10 and the seats in skirts 26 and 28 does not occur until the expansion of gate valve 10 after segment 24 has engaged stop 27. Gate 22 after segment 24 engages stop 27 moves downwardly around ¾ inch relative to segment 24 and an expansion of valve 10 during such movement provides a fluid-tight metal-to-metal sealing relation between gate 22, segment 24 and the seats in respective seat skirts 26, 28. The lateral expansion between gate 22 and segment 24 is relatively small of around 0.060 inch for a 16 inch diameter valve. When valve 10 is in the fully closed position as shown in FIG. 2, pressurized gas in cavity 94 is at a pressure of around 800 1PSI. It is noted in FIG. 2 that opening 36 in gate 22 in the fully closed position is displaced vertically relative to opening 36 in segment 24 and this displacement occurs during the expansion of gate 22 and segment 24 after segment 24 engages stop 27. While deceleration for a 16 inch diameter valve commences around one and one-half inches before segment 24 engages stop 27 this distance would vary for different diameter valves. For example, with valve 10 being around 30 inches in diameter, the deceleration might commence around 2 inches before segment 24 engages stop 27. Deceleration would occur generally between around ¾ inch and three inches before segment 24 engages stop 27. Gate valve 10 may easily be moved to fully closed position in less than five seconds and generally between two and three seconds after the opening of a hydraulic dump valve.

It is to be understood that under some conditions of use, it might be desirable to move an expanding gate valve to an open position in a minimum of time in order to vent or relieve a pressure condition. For this purpose, it might be desirable to place opening 36 in the upper portion of gate 10 instead of the lower portion as shown and illustrated in the drawings. Then the downward movement of gate valve 10 would result in opening gate valve 10 in a minimum of time.

To move valve 10 to an open position from closed position, a hydraulic fluid pressure as high as around 3,000 PSI might be required to initially break the valve loose, then a hydraulic fluid pressure around 75 PSI higher than the pressurized gas in cavity 94 is required in order to raise valve 10 to its open position.

Another embodiment of the actuator of this invention is shown in FIG. 6 and indicated generally at 230. Actuator 230 differs from actuator 12 in that it includes a spring to resiliently urge the piston toward an extended position. This embodiment of the actuator of this invention is mounted on a gate valve in a fashion like that shown in FIGS. 1 and 2. FIG. 6 shows actuator 230 mounted on top of a yoke 232 of a gate valve such as an expanding gate valve. For purposes of clarity, and to avoid repetition FIG. 6 does not show the complete gate valve structure.

Actuator 230 includes a cylinder 234 containing a helical spring 236 in one end portion which contacts one side of a piston 238 and urges it toward an extended position. Cylinder 234 has a vent aperture 240 through end 242 of the cylinder end portion containing spring 236. Vent 240 provides a relief for cavity 244 containing spring 236 so air can enter and exit cavity 244 as piston 238 moves. The mounted end portion of cylinder 234 has a flange 246 which abuts a cylinder base plate 248. Bolts extend through flange 246, through cylinder base plate 248 and into the end portion of yoke 232 to rigidly secure cylinder 234 to a valve.

Piston 238 is rigidly secured to a stem 250 which extends from the cylinder through cylinder base plate 248. Piston 238 has rings 252 around its perimeter for sealing with the internal surface of cylinder 234. Piston 238 has a protrusion on the stem side thereof in the form of an enlarged portion around stem 250 at its juncture with the piston. This enlarged portion has an essentially cylindrical and cross-sectionally round portion 254 adjacent to the piston and a generally frusto-conically shaped portion or tapered portion 256 on its opposite end portion. A seal plate member 258 is mounted inside the mounted end portion of cylinder 234 as shown. Seal plate 258 has a centrally disposed aperture 260 to pass stem 250 and serve as a metering aperture when the enlarged portion is positioned therein. Another aperture 262 through seal plate 258 provides a metering passageway to regulate the flow of fluid from a cavity 264 formed between piston 238 and seal plate 258 when the piston moves from a retracted position to an extended position. A recessed portion is provided in one side of seal plate 258 to form a cavity 266 between seal plate 258 and cylinder base plate 248. Apertures 260 and 262 are in open fluid communication with cavity 264 and cavity 266. Cylinder base plate 248 has three apertures therethrough for providing fluid communication between cavity 266 and the control system for actuator 230. Two of these apertures are visible in FIG. 6. The visible apertures 268 and 270 have fluid fittings 272 and 274 respectively connected therewith for connecting fluid conduits as shown. Fittings 272 and 274 are each connected by conduits to hydraulic dump valve of the actuator's control system. The third aperture which is not visible in FIG. 6 is connected in fluid communication with a portion of the actuator control system that functions to fill cavity 266 for raising or retracting piston 238. A stem packing assembly is provided around stem 250 on cylinder base plate 248.

In use actuator 230 is mounted on a valve such as an expanding gate valve as described above and connected in fluid communication with an actuator control system. The actuator control system preferably used with actuator 230 is the control system shown in FIG. 5 with the pneumatic charging assembly deleted. The hydraulic charging assembly and the hydraulic discharge assembly function as described above to open and close the valve by retracting, holding and releasing the piston, stem and valve closure assembly. Operation of valve actuator 230 is essentially the same as the operation of valve actuator 12 except that spring 236 urges the piston and stem toward an extended position instead of the gas. The hydraulic cushioning and deceleration of the piston, stem and valve closure assembly occurs the same as described above. In retraction of piston 238 and opening of a valve the hydraulic forces on the piston must overcome the forces of spring 236.

In the manufacture of the valve, valve actuators and control systems of this invention it is obvious to one skilled in the art that same can be constructed and assembled to achieve the finished product. The valve actuators are relatively simple in terms of the number of parts and their construction. Control system 16 utilizes commercially available elements which can be combined as illustrated to function cooperatively in controlling valve actuators. The valve, valve actuators, and control systems are particularly well suited for application where high temperatures are encountered over around 450° F. and where a metal-to-metal sealing relation is required between a gate valve and its adjacent seats. A gas spring as shown in the embodiment of FIGS. 1-5 is especially adapted for use with relatively large diameter gate valves such as 10 inches in diameter and over.

What is claimed is:

1. A gate valve and actuator assembly therefor, particularly adapted for high temperature service over around 450° F. comprising:

a gate valve body having a main flow passage therethrough and spaced seats therein about the flow passage, an expanding gate assembly within said body between the seats including a gate valve member having a notch on one face thereof and a segment movably mounted in said notch and carried on said gate valve member, said gate valve member and segment having an opening in a lower portion thereof alignable with said flow passage in a retracted position, an operating stem secured to the gate valve member for movement therewith, said gate valve body including a stop therein for limiting movement of said segment when moved to an extended closed position of said gate valve member;

a gas-hydraulic valve actuator mounted on the gate valve adjacent an upper end of said valve stem, said valve actuator including a cylinder with a piston therein secured to the upper end of said stem forming a hydraulic fluid chamber with hydraulic fluid on the lower side of said piston and a closed gas chamber with pressurized gas on the upper side of said piston to urge said piston and said stem continuously to the extended closed position of the gate valve; and said actuator including means to meter hydraulic fluid flowing from the cylinder to slow the rate of travel of said stem adjacent the end of travel of the gate member to extended position, said means to meter permitting a fast rate of travel of said gate valve member and decelerating the movement of said gate valve member and segment between around ⅜ inch and three inches from said stop, the metering of fluid by said means to meter providing a relatively slow rate of travel when the segment engages the stop to minimize the slamming action of the segment against the stop, said gate valve member moving downwardly after said segment has been stopped to provide lateral expansion between the gate valve member and segment for fluid-tight metal-to-metal sealing engagement with the seats, said means to meter thereby permitting a relatively slow expansion of the gate assembly to fully seated position while permitting the gate assembly to move to an extended position in a minimum of time.

2. A gate valve and actuator assembly as set forth in claim 1 wherein a yoke receiving the valve stem is mounted on and secured to the valve body, a bonnet receiving the valve stem is positioned within the valve body and has an outer peripheral surface spaced from the adjacent inner surface of the valve body, and a pressure seal is mounted in the space between the outer peripheral surface of the bonnet and the valve body whereby upon a failure of the pressure seal the bonnet moves outwardly relative to said yoke and said valve body.

3. A gate valve, valve actuator, and control means therefor, comprising:

a gate valve body having spaced seats therein, an expanding gate assembly within said body between the seats including a gate valve member having a notch on one face thereof and a segment movably mounted in said notch and carried on said gate valve member, an operating stem secured to the gate valve member for movement therewith, said gate valve body including a stop therein for limiting movement of said segment when moved to a closed position of said gate valve member;

a gas-hydraulic valve actuator mounted on the gate valve adjacent an upper end of said valve stem, said valve actuator including a cylinder with a piston therein secured to the upper end of said stem with hydraulic fluid on the lower side of said piston and a pressurized gas on the upper side of said piston to urge said piston and said stem to a closed position of the gate valve, said cylinder forming a liquid chamber adjacent the lower side of said piston and a gas chamber adjacent the other side of the piston;

said actuator including means to meter hydraulic fluid flowing from the cylinder to slow the rate of travel of said stem adjacent the end of travel of the gate member to a closed position;

said means to meter permitting a fast rate of travel of said gate valve member and decelerating the movement of said gate valve member and segment immediatley before the segment engages said stop, the metering of fluid by said means to meter providing a relatively slow rate of travel when the segment engages the stop to minimize the slamming action of the segment against the stop, said gate valve member moving downwardly after said segment has been stopped to provide lateral expansion between the gate valve member and segment for fluid-tight sealing engagement with the seats, said means to meter thereby permitting a slow expansion of the gate assembly to fully seated position while permitting the gate assembly to close in a minimum of time;

means to pressurize said gas chamber with a gaseous fluid at a predetermined pressure, means to pressurize the liquid chamber with liquid fluid to a predetermined pressure, a liquid fluid reservoir, and means to remove liquid fluid from said liquid chamber having a remotely controllable valve in fluid communication with and between the fluid reservoir and the liquid chamber, said means to remove liquid permitting said piston to move to an extended position under forces exerted by the pressurized gas in said gas chamber;

said valve gate member being moved to its closed position by liquid fluid in said liquid chamber being passed to said reservoir by forces exerted against said piston from the pressured gas chamber;

said valve gate member being moved to its open position by liquid fluid from said reservoir being passed into the iquid chamber to move the piston upwardly, and control means to maintain the gate member in a normally open position and upon command release liquid fluid from the liquid chamber to close the valve.

4. The valve, valve actuator, and control means of claim 3, wherein said means to remove liquid fluid has a pair of parallel connected valves in fluid communication between said cylinder opposite end portion and said liquid fluid reservoir, said pair of valves each have separate pilot valves and pilot operators therefor, and said pilot valves each have a pair of electrical solenoids mounted thereon with either of said solenoids being operable to actuate said respectively mounted pilot valve.

5. The valve, valve actuator and control means of claim 4, wherein said pilot valves and said pilot operators are pneumatic.

6. A gate valve structure particularly adapted for high temperature service over around 450° F. and comprising:
- a gate valve body having a flow passage therethrough and a pair of spaced annular seats about the flow passage, a gate valve member mounted for movement between the seats and having an operating stem secured thereto for movement therewith, said gate valve body having an upper body portion forming an upper valve receiving chamber, said upper body portion having an open upper end and said valve stem extending outwardly therefrom, a yoke mounted and supported on the upper end of said upper body portion about said valve stem, means securing the yoke to the upper body portion;
- a valve actuator secured to the upper end of said yoke including a gasliquid cylinder with a piston therein secured to the upper end of said stem and dividing the cylinder into a lower liquid chamber on the lower face of the piston and an upper gas chamber on the upper face of the piston, fluid control means for the actuator to move the gate valve member between open and closed positions relative to the flow passage;
- a bonnet receiving the valve stem positioned within the upper body portion of said valve body and having an outer peripheral surface spaced from the adjacent inner surface of said upper body portion, a shear ring mounted between said bonnet and said upper body portion, adjustable mounting means extending between the bonnet and shear ring to position the bonnet with respect to the upper body portion, said bonnet including a central opening receiving the stem and packing within said opening about the stem, and a pressure seal mounted in the spacing between the outer peripheral surface of the bonnet and the upper body portion whereby upon reaching an excessively high fluid pressure within the upper body portion sufficient to fail the pressure seal, the bonnet moves outwardly independent of and relative to said yoke and said upper body portion, said fluid control means being operable to move the gate valve member even after a failure of said pressure seal.

7. A gate valve structure as set forth in claim 6 wherein said upper body portion has an annular groove about its inner periphery receiving said shear ring and has an outwardly tapering inner surface immediately inwardly of the annular groove, and said shear ring is positioned adjacent said outwardly tapering inner surface and is generally frusto-conical in cross section.

8. A gate valve structure particularly adapted for high temperature service comprising:
- a gate valve body having a flow passage therethrough, a gate valve member mounted for movement between open and closed positions relative to the flow passage and having an operating stem secured thereto for movement therewith, said gate valve body having an upper body portion forming an upper valve receiving chamber, said upper body portion having an open upper end and said valve stem extending outwardly therefrom;
- a valve actuator including a fluid cylinder with a piston therein secured to the upper end of said stem, means supporting the fluid cylinder on the upper body portion of the gate valve body;
- a bonnet independent of the supporting means for the fluid cylinder positioned within the upper body portion of said valve body and having an outer peripheral surface spaced from the adjacent inner surface of said upper body portion, yieldable means between the bonnet and the upper body portion securing the bonnet to the upper body portion, a pressure seal mounted in the spacing between the outer peripheral surface of the bonnet and the upper body portion whereby upon reaching an excessively high fluid pressure within the upper body portion sufficient to fail the pressure seal and the yieldable means, the bonnet moves outwardly independent of and relative to said upper body portion and supporting means for the actuator, said actuator being operable to move the gate valve member even after a failure of said pressure seal and yieldable means results in an outward movement of the bonnet.

9. A gate valve structure as set forth in claim 8 wherein said yieldable means comprises a shear ring mounted between said bonnet and said upper body portion, and adjustable mounting means extend between the bonnet and shear ring to position the bonnet with respect to the upper body portion and the pressure seal.

10. A gate valve structure particularly adapted for high temperature service over around 450° F. and comprising:
- a gate valve body having a flow passage therethrough and a pair of spaced annular seats about the flow passage, said gate valve body having an upper body portion forming an upper valve receiving chamber, an expanding gate assembly mounted for movement between the seats in the upper body portion, said gate assembly including a gate valve member having a notch on one face thereof and a segment movably mounted in said notch and carried on said gate valve member, an operating stem secured to the gate valve member for movement therewith, said gate valve body including a stop therein for limiting movement of said segment when moved to a closed position of the gate valve member, said upper body portion having an open upper end and said valve stem extending outwardly therefrom;
- a yoke mounted and supported on the upper end of said upper body portion about said valve stem, means securing the yoke to the upper body portion, a valve actuator secured to the upper end of said yoke including a gas-liquid cylinder with a piston therein secured to the upper end of said stem and dividing the cylinder into a lower liquid chamber adjacent the lower face of the piston and an upper gas chamber adjacent the upper face of the piston;
- means to meter hydraulic fluid from the cylinder to slow the rate of travel of said gate valve assembly adjacent the end of travel of the gate member, said means to meter permitting a fast rate of travel of said gate valve member and decelerating the movement of said gate valve member and segment at least around ¾ inch from the stop, the metering of fluid providing a relatively slow rate of travel when the segment engages the stop to minimize the slamming action of the segment against the stop, said gate valve member moving downwardly after said segment has been stopped to provide lateral expansion between the gate valve member and segment for fluid-tight sealing engagement with the seats;

a bonnet spaced from the yoke positioned within the upper body portion of said valve body and having an outer peripheral surface spaced from the adjacent inner surface of said upper body portion; and means between the bonnet and the upper body portion connecting the bonnet to the upper body portion independent of the yoke and being yieldable at a predetermined high fluid pressure within said upper body portion, whereby upon reaching an excessively high fluid pressure within the upper body portion sufficient to fail the yeildable means between the bonnet and said upper body portion the bonnet moves outwardly independent of and relative to said yoke and said upper body portion, said valve actuator being operable to move the gate valve assembly even after a failure of said yieldable means and movement of said bonnet.

* * * * *